United States Patent [19]
Erickson et al.

[11] 3,984,670
[45] Oct. 5, 1976

[54] EXPANDABLE DIGITAL ARITHMETIC LOGIC REGISTER STACK

[75] Inventors: Charles Erickson, Fremont; Krishna Rallapalli, San Jose; Peter W. J. Verhofstadt, Saratoga, all of Calif.

[73] Assignee: Fairchild Camera and Instrument Corporation, Mountain View, Calif.

[22] Filed: Mar. 26, 1975

[21] Appl. No.: 562,378

[52] U.S. Cl.............................. 235/156; 340/172.5
[51] Int. Cl.².......................................... G06F 7/50
[58] Field of Search................... 235/156; 340/172.5

[56] References Cited
UNITED STATES PATENTS

| | | |
|---|---|---|
| 3,757,308 | 9/1973 | Fosdick............................ 340/172.5 |
| 3,904,977 | 9/1975 | Barsotti............................ 307/243 X |

Primary Examiner—R. Stephen Dildine, Jr.
Attorney, Agent, or Firm—Alan H. MacPherson; Henry K. Woodward; J. Ronald Richbourg

[57] ABSTRACT

An arithmetic logic register stack device is provided on a single semiconductor chip, which device comprises a building block for digital systems. The device of this invention is expandable, which enables performing operations with binary numbers greater than that with which a single device is capable of performing. Unique circuit design is provided for multiple use of connector pins to the semiconductor device, thereby allowing for an increase in the complexity of the circuits that can be integrated onto a single semiconductor chip or placed into a package with a given number of pins.

16 Claims, 12 Drawing Figures

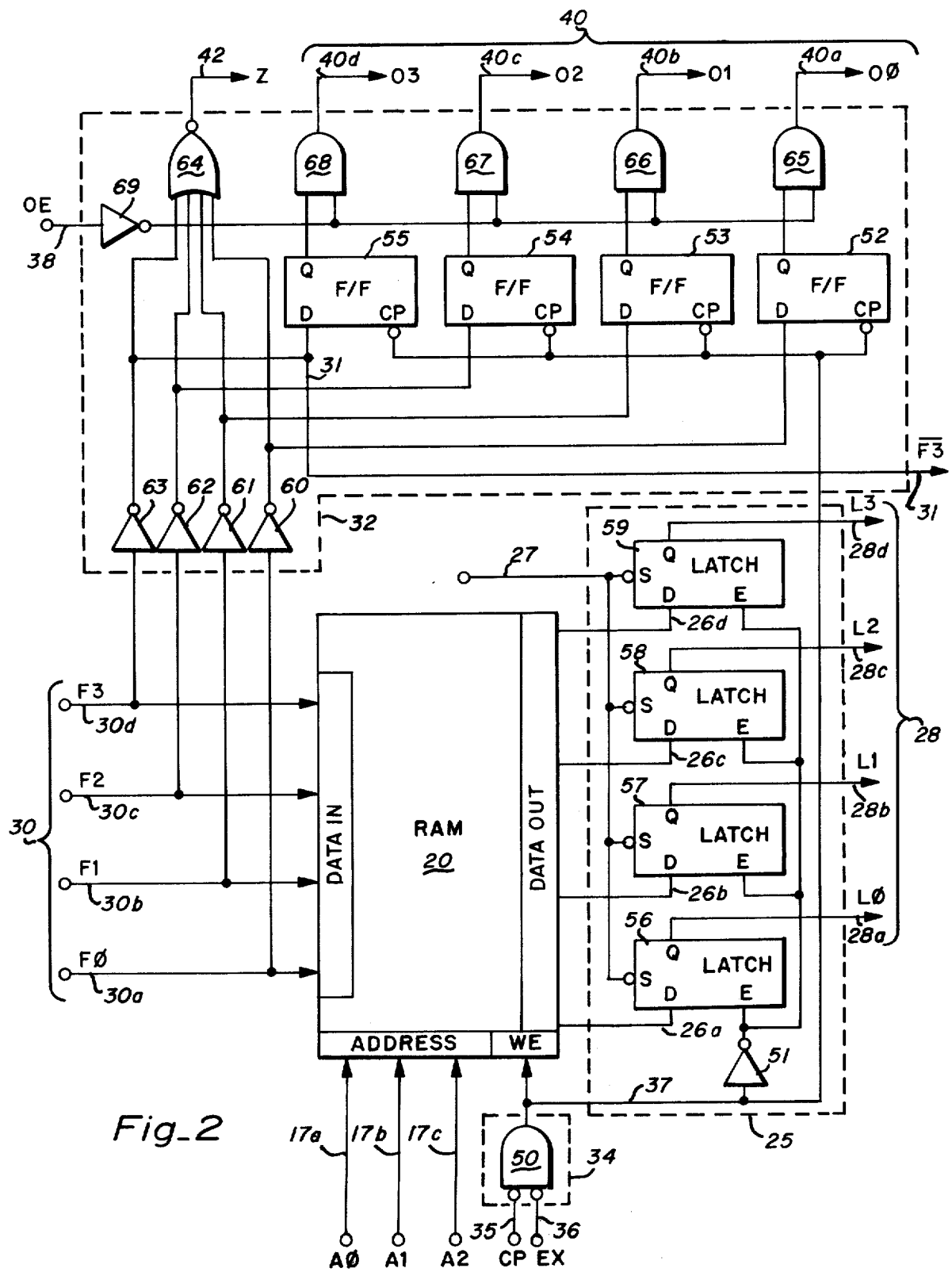
Fig_2

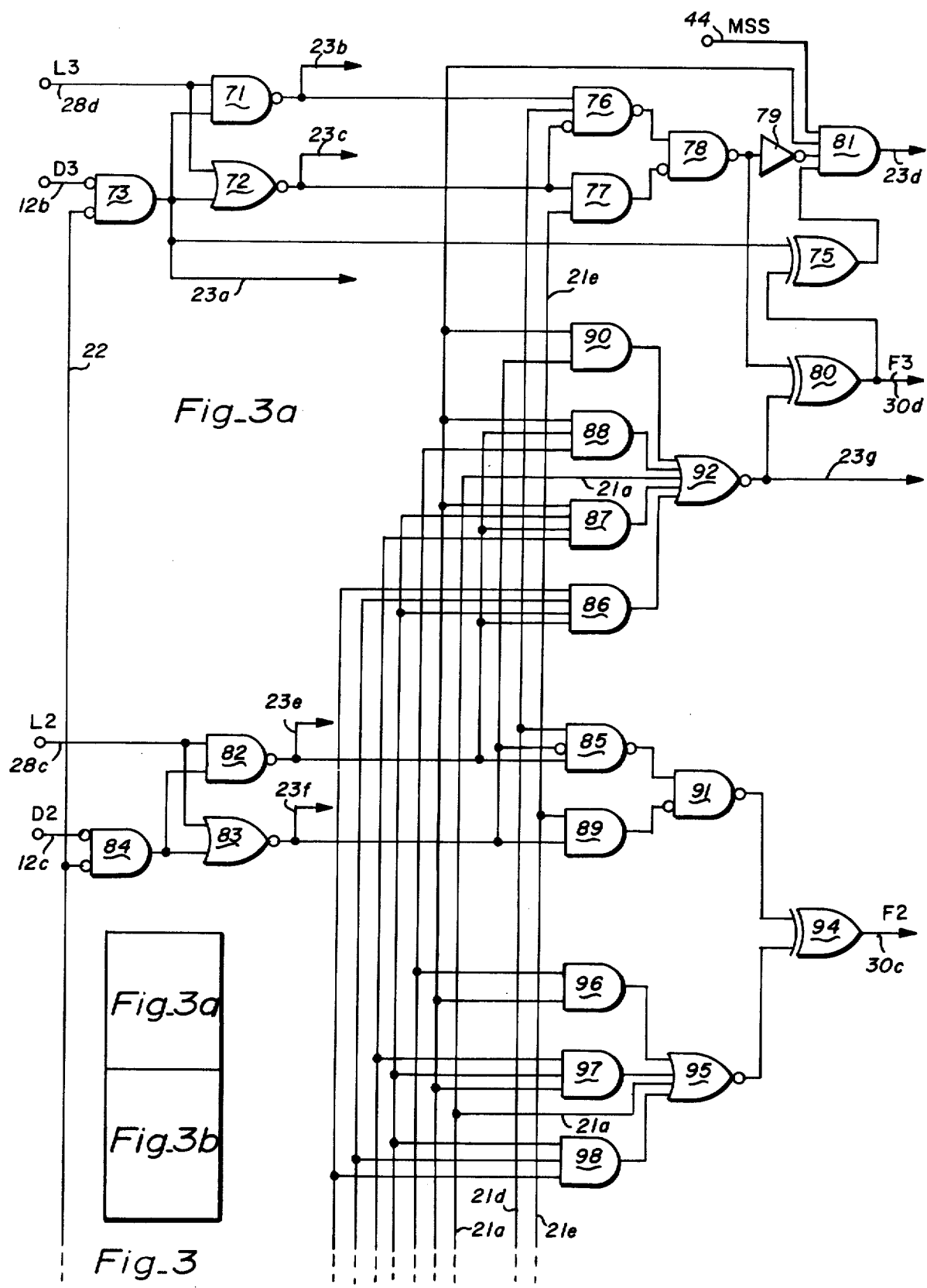
Fig_3a
Fig_3a
Fig_3b
Fig_3

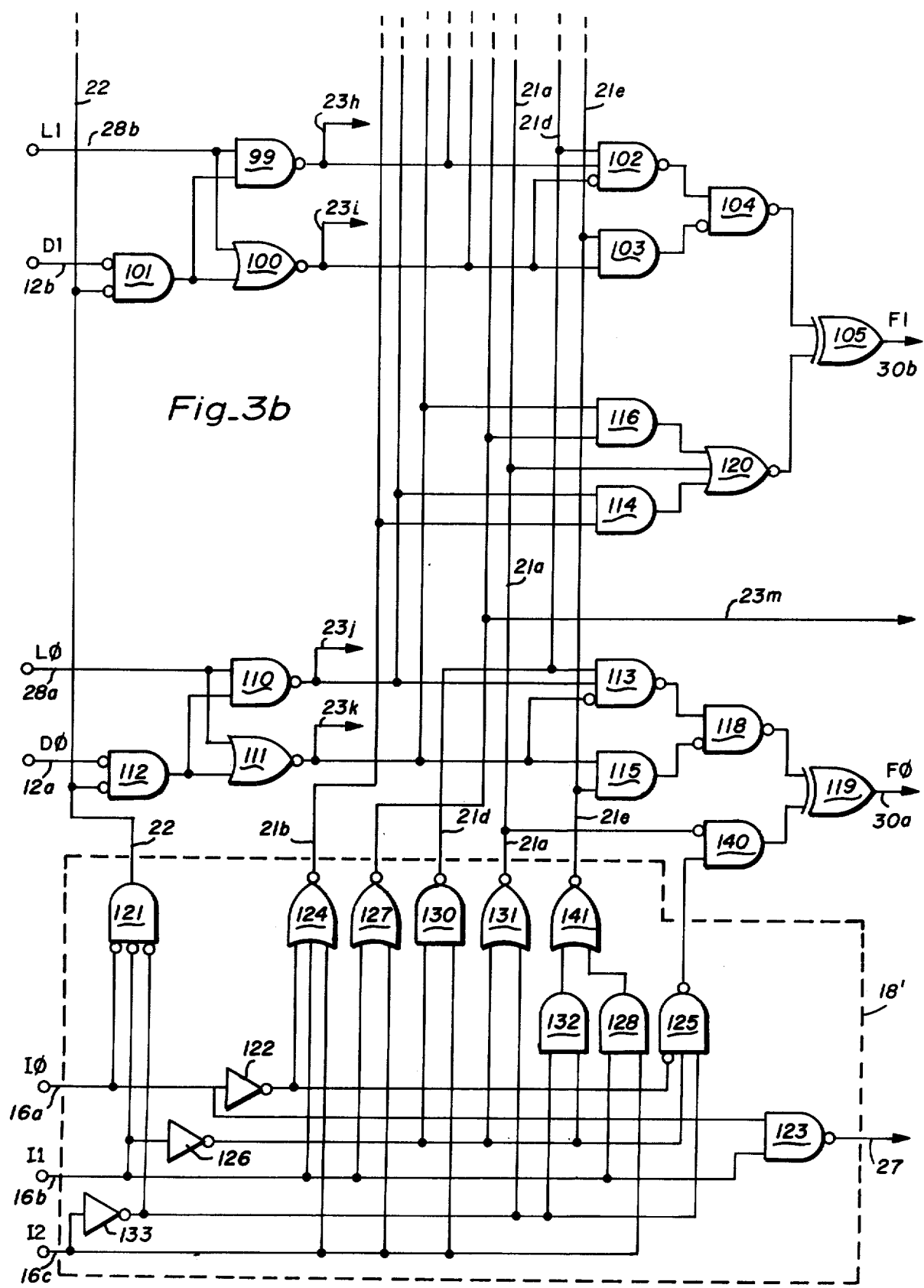
Fig_3b

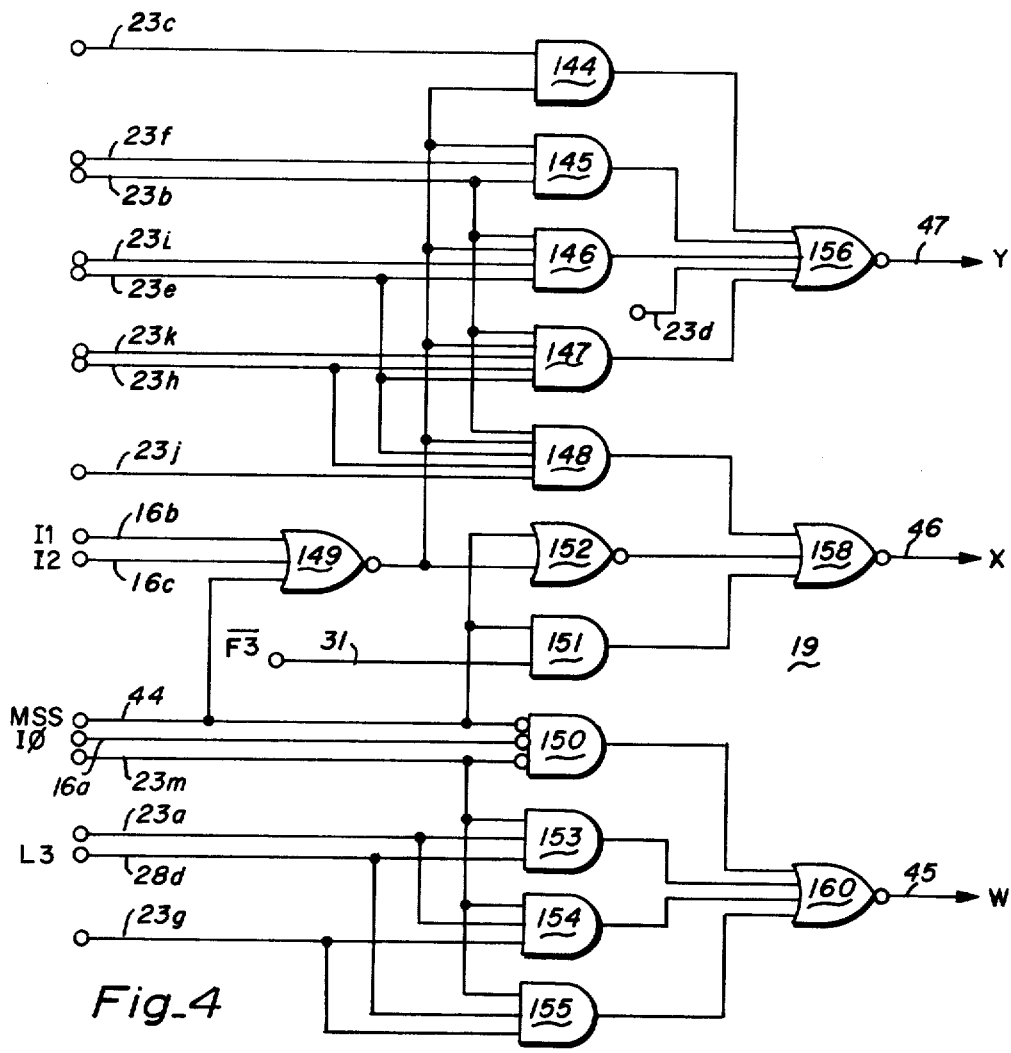
Fig_4
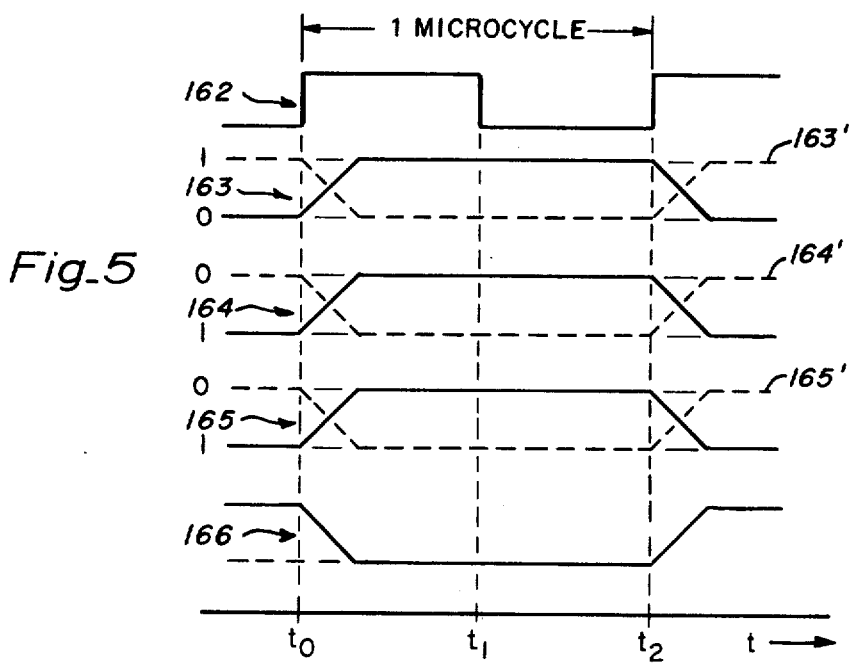
Fig_5

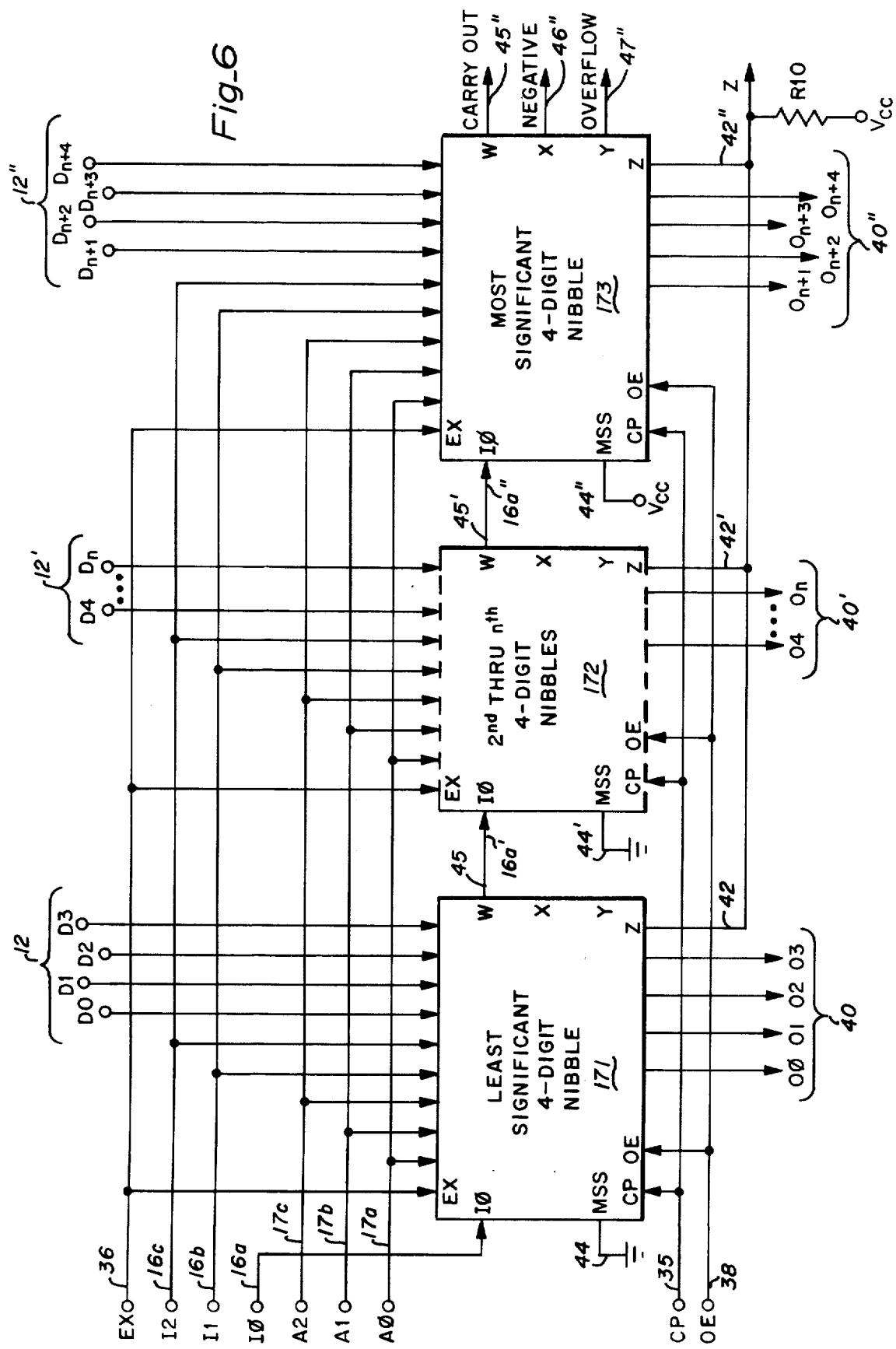

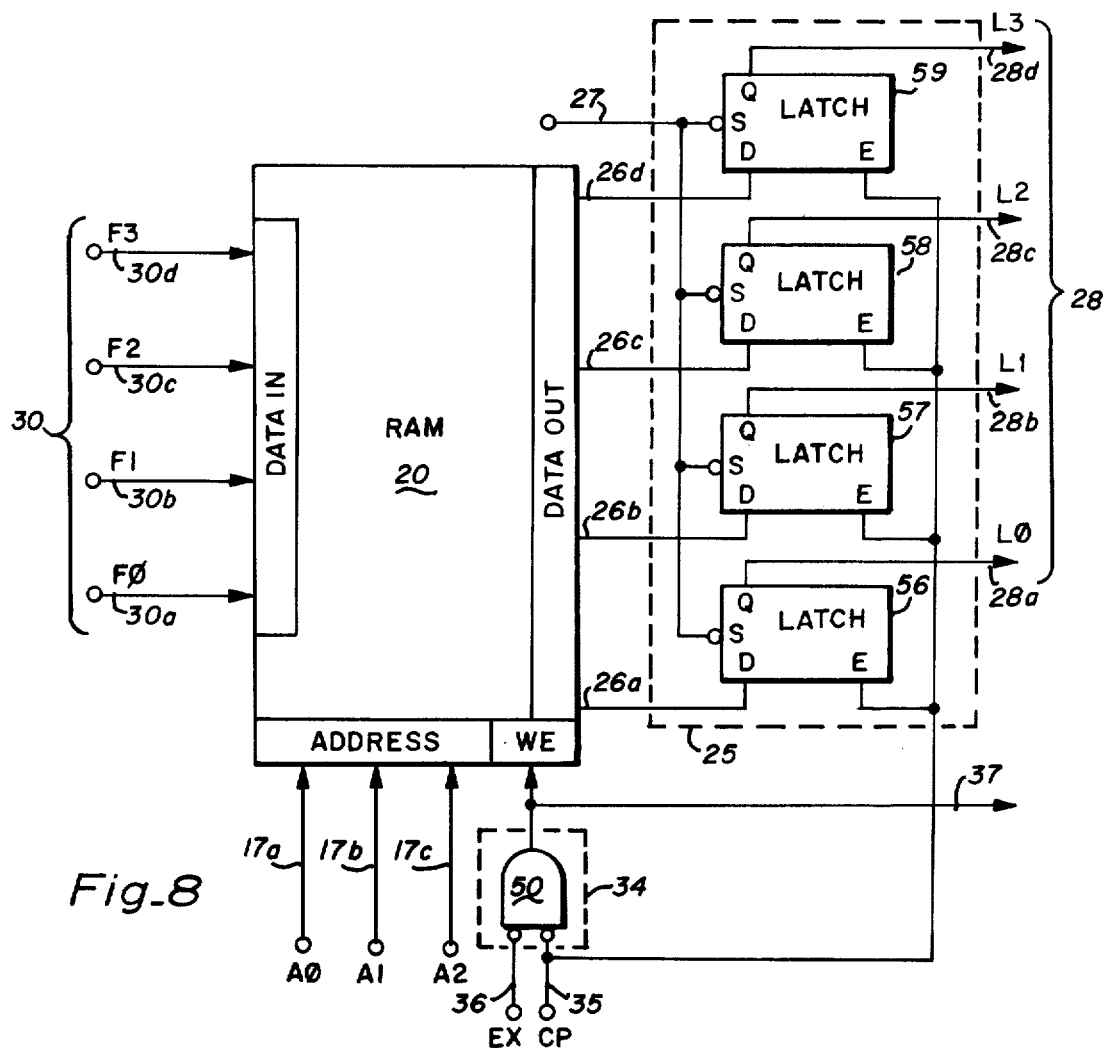
Fig_8
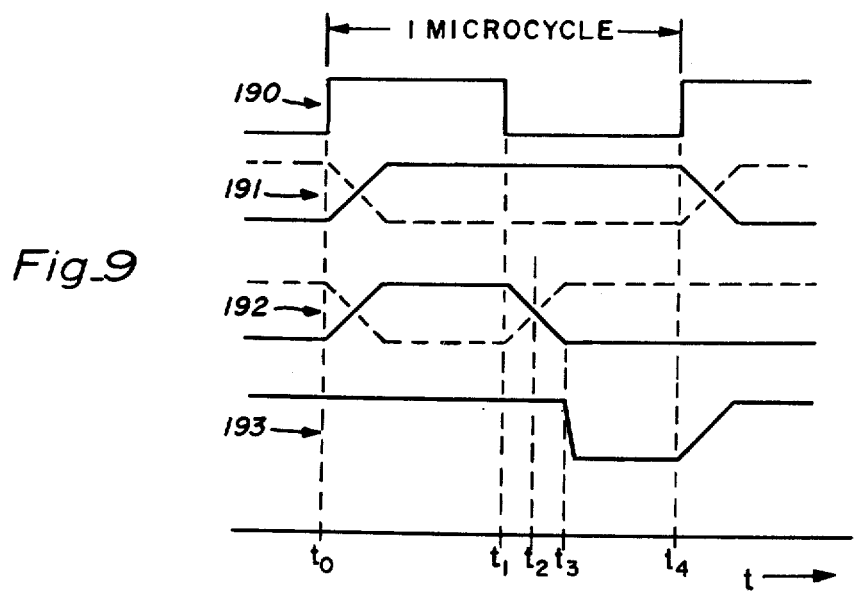
Fig_9

EXPANDABLE DIGITAL ARITHMETIC LOGIC REGISTER STACK

BACKGROUND OF THE INVENTION

1. Field of the Invention

This invention relates generally to building block components for use in high performance programmable digital systems, and in particular to an arithmetic logic register stack integrated onto a single semiconductor chip.

2. Prior Art

In the past, digital systems have been fabricated from a multiplicity of logic circuits such as AND or OR gates, flip-flops, and the like. From one to four such logic circuits are integrated onto a single semiconductor chip. These logic circuits are commonly referred to in the art as small scale integration. Numerous small scale integrated logic circuits are assembled onto a board containing printed circuit interconnections between each of the individual logic circuits, and numerous such assembled boards are electrically interconnected for constructing programmable digital systems. These digital systems have disadvantages of being large in size, requiring large amounts of power for operation, and are relatively slow in operation due to the physical distance between components.

More recently, typical circuits frequently employed in constructing digital systems have been integrated onto a single chip thereby mitigating somewhat the above-described disadvantages. One such example of such a typical integrated circuit is a multiplexer.

With recent improvements in integrated circuit technology, a still larger number of circuit components can be integrated onto a single semiconductor chip. Thus, larger portions of digital systems can be combined onto a single semiconductor chip. However, this improvement in the integrated circuit art has brought about different types of problems. For example, integrated circuits for digital systems were custom made for different applications, and the cost for such custom-made circuits is prohibitive. Also, with a larger number of circuits on a single semiconductor chip, a concomitant increase in the number of pin connections to the integrated circuit were required.

SUMMARY OF THE INVENTION

Accordingly, the present invention overcomes these more recent problems by providing a digital system building block designed on a system architecture level vis-a-vis circuit level. In addition, the number of pin connections have been reduced by employing unique circuit designs within the building block. Also, provisions have been made as a result of unique circuit designs to enable expansion of one building block to several building blocks to thereby expand the number of binary digits upon which operations can be performed.

As a feature of this invention a limited number of connector pins on the semiconductor package containing the complicated integrated circuit chip are used to carry a number of functions in excess of the number of pins. This is done by providing in the chip circuit structures for selectively and sequentially applying to selected pins more than one function in accordance with the states of control signals. While these control signals are described as coming from outside the chip in general, these control signals can also be generated within the chip. The result of this innovation is to allow for an increase in the complexity of the circuits which can be integrated onto a single semiconductor chip or placed into a package with a given number of connector pins.

In accordance with this invention, an expandable arithmetic logic register stack is provided on a single semiconductor chip, which comprises means for storing digital data having an address input, a data input, and a data output; means for performing arithmetic and logic operations having a first operand input coupled to an input of the arithmetic logic register stack, a second operand input coupled to the data output of the means for storing, a result data output coupled to the data input of the means for storing, control signal input terminals disposed for receiving instruction codes indicative of arithmetic and logic operations to be performed; and control signal output terminals disposed for providing signals indicative of the results of the arithmetic and logic operations being performed; an output register coupled between the result data output of the means for performing and a data output of the arithmetic logic register stack; and, circuit means disposed for providing status output signals of the arithmetic logic register stack and having an input coupled to the control signal output terminals of the means for performing. The circuit means includes a first means for providing arithmetic carry information signals on the output terminals during arithmetic operations and instruction code signals on the output terminals during logic operations in response to a first atate of the circuit means, and a second means for providing status information signals on the output terminals in response to a second state of the circuit means.

Another feature of the digital arithmetic logic register stack of the present invention is expandability for performing operations with binary numbers greater than that for which a single arithmetic logic register stack is designed. That is, N digital arithmetic logic register stacks can be coupled together in parallel for performing operations with M-digit binary numbers, wherein N is an integer at least equal to two and M is an integer equal to 4×N. The circuit means within the arithmetic logic register stacks includes gating means for providing arithmetic carry information signals during arithmetic operations and instruction code signals during logic operations on the output terminals of N-1 of the arithmetic logic register stacks, and for providing status information signals on the output terminals of the Nth one of the arithmetic logic register stacks, wherein the Nth one of the arithmetic logic register stacks performs operations on the four most significant digits of the M-digit binary number.

BRIEF DESCRIPTION OF THE DRAWINGS

FIG. 2 is a logic block diagram of the random access memory (RAM) latch circuit, and output register for the ALRS;

FIG. 3 is a unitary diagram illustrating the sheets, containing FIGS. 3a and 3b;

FIGS. 3a and 3b are a logic diagram of the input gating circuit, arithmetic logic unit (ALU), and instruction decode circuit for the ALRS;

FIG. 4 is a logic diagram of the control circuit for the ALRS;

FIG. 5 is a conceptual timing diagram for the ALRS;

FIG. 6 is a block diagram of an array employing a plurality of the ALRS of this invention with a ripple carry feature;

FIG. 8 is a logic diagram of an alternate write enable circuit connection for the RAM and the latch circuit;

FIG. 9 is a conceptual timing diagram for the alternate circuit connection shown in FIG. 8; and, FIG. 10 is a planar view of the ALRS of this invention in integrated form.

DETAILED DESCRIPTION

Figure 1:
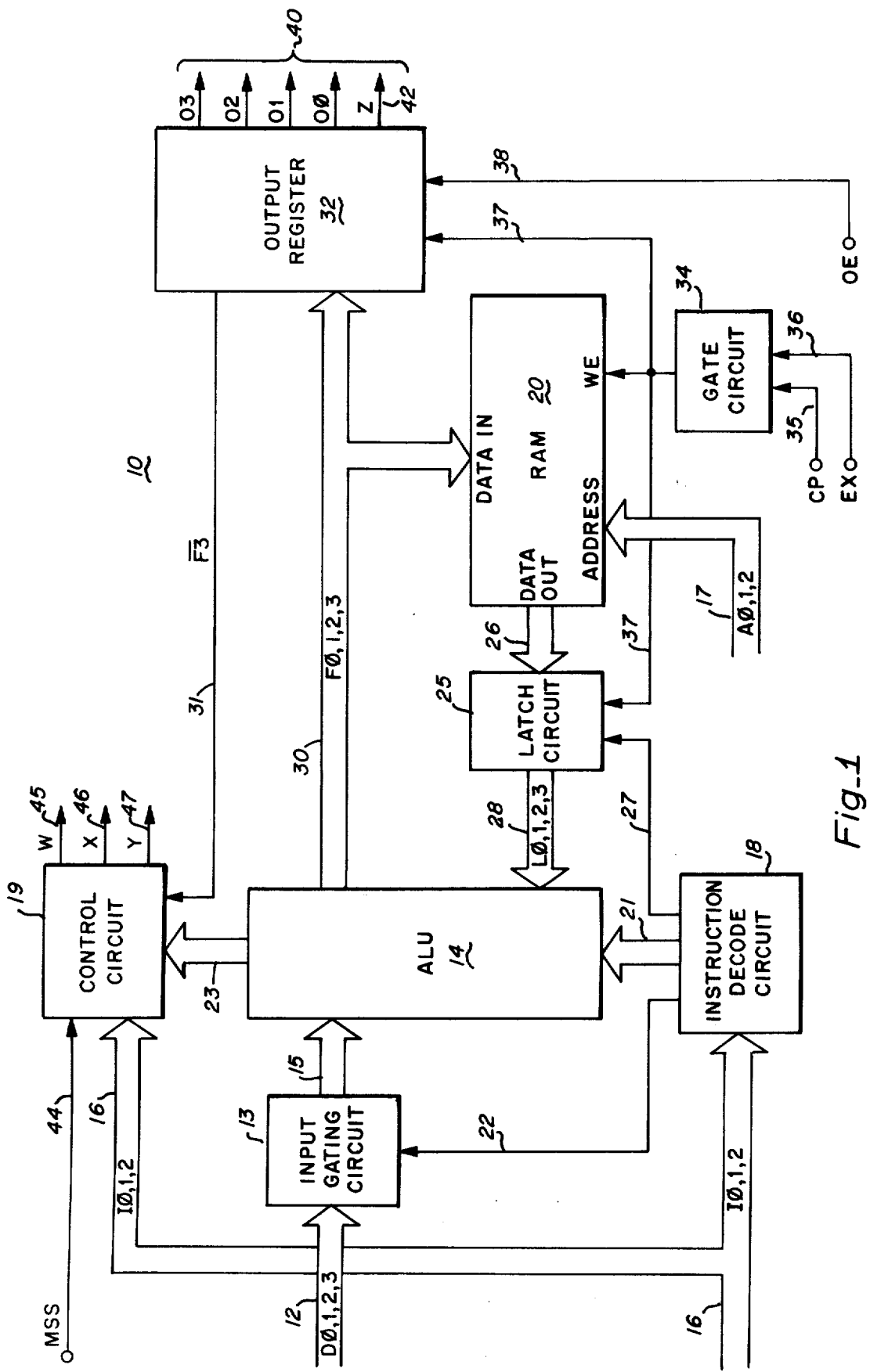
FIG. 1 is an overall block diagram of the arithmetic logic register stack (ALRS) of this invention.

Referring now to FIG. 1, an overall block diagram is illustrated of an arithmetic logic register stack (ALRS) 10 constructed in accordance with the principles of this invention. The ALRS 10 constitutes a building block for use in digital systems; as for example, but not limited to, calculators, microprocessors, data processing equipment, and other high performance programmable digital systems. The term "stack" in the title implies that the ALRS 10 comprises along other things a memory array, and more than one register.

In one embodiment of the invention described hereinafter, input and output data refers to a binary number comprising four (4) binary digits; which is also referred to herein as a four-digit nibble of binary data. The term "nibble" is used herein to refer to a combination of four binary digits. Though one embodiment of this invention is illustrated and described for operations with four binary digits, it is possible for those skilled in the art to construct an ALRS in accordance with the principles of this invention for operations with a larger number of binary digits, different techniques, and different logic designs. Hence, the disclosed embodiment is by way of illustration only and is not limited to four binary digits. As will be set forth with greater particularity hereinbelow, a plurality of the ALRS 10 can be coupled together to form an array for operations with a larger number of nibbles.

The instruction decode circuit 18 deciphers operations to be performed by the ALU 14 from the state of the combined I-field bits I0, I1 and I2, and supplies control signals to the ALU by means of a bus 21. Also, an input enable/disable control signal is supplied from the instruction decode circuit 18 to the input gating circuit 13 by means of a connecting line 22. Signals indicative of the status of the arithmetic operations being performed by the ALU 14 are supplied to the control circuit 19 by means of a bus 23. For example, status signals indicative of carry-output (Co), carry propagate (P), carry generate (G), over-flow (V), and negative (N) are supplied on the bus 23 to the control circuit 19. Each of these status signals will be described in greater detail hereinbelow.

In one embodiment of this invention, the RAM 20 contains eight locations (R0 through R7) for storing eight 4-digit nibbles of binary data. Each of the locations R0 through R7 are addressed by eight possible combinations ($2^3=8$) of the A-field three bits of instruction code provided on the address bus 17. Data contained in an address location of the RAM 20 are retrieved in response to a combination of the A-field three bits, and are supplied to a latch circuit 25 by means of a data-out bus 26. The latch circuit 25 comprises a conventional latch circuit, which temporarily stores binary data until acted upon by an external control signal. Such a control signal is supplied to the latch circuit 25 from the instruction decode circuit 18 by means of a line 27. The contents of the latch circuit 25 (digits L0, L1, L2 and L3) are supplied to a second operand input of the ALU 14 by means of a bus 28. Thus, data retrieved from the RAM 20 (L0, L1, L2 and L3) constitutes the second operand for performance of operations by the ALRS 10, and by the ALU 14 in particular.

Normally, during an arithmetic operation, the ALU 14 accepts the first operand from the bus 15 and the second operand from the bus 28, performs an operation thereon in accordance with the instruction signals supplied on the bus 21 from the decode circuit 18, and supplies a result of this operation in the form of a four-digit binary number on a result bus 30. Simultaneously, the ALU 14 supplies operation status signals to the control circuit 19. The four digits of the binary number supplied on the result bus 30 from the ALU 14 are referred to herein as F0, F1, F2 and F3. The result bus is coupled to a data input of the RAM 20, and to inputs of an output register 32. The inversion of the high-order digit ($\overline{F3}$) of the result binary number is supplied as an input to the control circuit 19 by means of a line 31 from the output register 32. The result binary number is written into the RAM 20 at an address provided on address bus 17 when a write enable (WE) control signal is supplied to the RAM 20.

The WE control signal is supplied to the RAM 20 from a gate circuit 34. A clock (CP) signal is supplied to a first input of the gate circuit 34 by means of a line 35, and an execute (EX) signal is supplied to the second input of the gate circuit 34 by means of a line 36. The clock (CP) and execute (EX) signals are supplied to the ALRS 10 from circuitry external thereof. The output of the gate circuit 34 is also supplied to an input of the latch circuit 25 and to an input of the output register 32 by means of a line 37.

Input data to the ALRS 10 (D0, D1, D2 and D3) is supplied on an input data bus 12, and constitutes a four digit binary number to be operated upon by the ALRS. Output data likewise constitutes a four digit binary number, and represents the result retrieved from the ALRS 10 in response to an instruction code and control signals (to be explained hereafter) supplied to the ALRS.

The input data bus 12 is coupled to the input terminals of an input gating circuit 13, and the output thereof is coupled to a first operand input of an arithmetic logic unit (ALU) by means of a bus 15. Thus, the input data D0, D1, D2 and D3 constitutes the first operand for performance of operations by the ALRS 10, and by the ALU 14 in particular.

Instruction codes are supplied to the ALRS 10 in the form of two fields of information. In this embodiment, each field comprises three binary digits or bits of information. The first field, which is referred to herein as the I-field, is supplied on an instruction bus 16. The second field, referred to herein as the A-field is supplied on an address bus 17. The three bits constituting the I-field of the instruction code are referred to herein as I0, I1 and I2. The instruction bits are supplied to inputs of an instruction decode circuit 18, and to inputs of a control circuit 19. The three bits constituting the A-field of the instruction code are referred to herein as A0, A1 and A2, and are supplied on the bus 17 to the address input of a random access memory (RAM) 20. A RAM is employed in one embodiment of this invention; however, other types of data storage means may be employed in lieu of a RAM.

The result binary number is stored in the output register 32 in response to a signal supplied on the line 37, and this data is temporarily stored until new result data is loaded into the output register. An output enable (OE) signal is supplied to the output register 32 from circuitry external to the ALRS 10. The output data from the ALRS 10 (O0, O1, O2 and O3) is supplied on lines 40 at the output of the output register 32 in response to an OE signal on the line 38. In addition, a signal indicative of a zero result from the ALRS 10 is supplied at the output of the output register 32 by means of a line 42, which signal is designated herein as zero (Z).

The ALRS 10 of this invention is expandable. That is, several such circuits as illustrated in FIG. 1 may be coupled together in an array to expand for performing operations with a larger number of digits per binary number (e.g., operations with a 16-digit binary number can be performed by coupling four exemplary ALRS's together). Hence, to operate more than one ALRS simultaneously in an array, it is necessary to designate one of the ALRS devices as being the most significant four-digit slice of the expanded binary number. This is accomplished by supplying a signal on a line 44 to an input of the control circuit 19. This signal is designated herein as MSS, and represents "most significant slice".

Three status signals are provided by the control circuit 19, which status sugnals are designated herein as W, X, and Y, and are supplied on lines 45, 46 and 47, respectively. For example, if the ALRS 10 is to be used independently as a four-digit binary number device, or as employed for the most significant slice in an array for use with binary numbers greater than four digits, then the signal supplied on the W output (line 45) is indicative of a carry-out (Co) status signal; the signal supplied at the X output (line 46) is indicative of a negative (N) binary number on the output lines 40 in twos (2's) complement notation; and the Y signal (line 47) is indicative of an overflow (V) operation that occurred in the ALU 14. However, as will be explained in greater detail hereinbelow, the X and Y signals are indicative of carry propagate (P) and carry generate (G) respectively, when the ALRS 10 is employed in an array and the ALRS is not employed as the most significant slice of the array.

Referring now to FIG. 2, a logic-block diagram of the RAM 20, latch circuit 25, and output register 32 are illustrated with interconnections therebetween. Lines 17a, 17b and 17c, which comprise the address bus 17, are coupled to the address input of the RAM 20. Lines 35 and 36, which transmit the clock (CP) and execute (EX) control signals respectively, are coupled to inverting inputs of an AND gate 50, which comprises the gate circuit 34. The output of the AND gate 50 is coupled by means of line 37 to the input of an inverter 51 within the latch circuit 25, and to inverting clock inputs of flip-flops through 55.

The output of the inverter 51 is coupled to the enable (E) inputs of latch circuits 56 through 59 within the latch circuit 25. The data out from the RAM 20 is supplied to the data (D) inputs of latches 56 through 59 by means of lines 26a through 26d, respectively. The line 27 from the instruction decode circuit 18 is coupled to an inverted input of each of the latches 56 through 59, which inputs are designated herein as S inputs. The S inputs of the latches 56 through 59 comprise a pre-set input, and when a low-level signal is supplied on the line 27 the outputs of the latches on the lines 28a and 28d are forced to a high level. Thus, a low-level signal on the line 27 will force the outputs of the latches (lines 28) to a logic one, which function is employed in performing certain non-arithmetic logic functions as will be explained in greater detail hereinbelow.

Lines 30a through 30d, which constitute the result bus 30 are coupled to the data input of the RAM 20, and to inputs of inverters 60 through 63. The outputs of the inverters 60 through 63 are coupled to the data (D) inputs of the flip-flops 52 through 55, and to four inputs of a NOR gate 64, respectively. The output of the inverter 60 is also coupled to the line 31, which transmits $\overline{F3}$ to the control circuit 19. The output of the NOR gate 64 is coupled to the line 42 which transmits a signal indicative of a zero (Z) state of the result-binary number on the result bus 30. The output of the NOR gate 64 has an "open collector". That is, the collector of the output transistor in the NOR gate 64 is not coupled through a resistor to a voltage supply, but, instread, the collector is coupled solely to the output of the gate. This technique is conventional in the art, and is employed as such to enable coupling the zero (Z) output of the ALRS 10 the the Z output of other ALRS's in an array as will be explained further hereinbelow.

The true (Q) outputs of the flip-flops 52 through 55 are coupled to one of two inputs of AND gates 65 through 68, respectively. The line 38, which transmits the output enable (OE) signal to the ALRS 10 is coupled to the input of an inverter 69 and the output thereof is coupled to the second input of the AND gates 65 through 68. The outputs of the AND gates 65 through 68 are coupled to lines 40a through 40d, respectively, of the output bus 40. The O0 through O3 signals supplied on the lines 40a through 40d have three possible states. That is, a first state represents a logic zero, a second state represents a logic one, and a third state is at a high impedance as a result of an open output circuit of the AND gates 65 through 68. Such gates are well known in the art. A high-level signal on the OE input line 38 causes the outputs of AND gates 65 through 68 to go to the high impedance state.

Referring now to FIG. 3, a unitary diagram is shown that illustrates the orientation of FIGS. 3a and 3b, which figures are set forth on separate sheets hereof. A portion of the ALU 14 is illustrated in FIG. 3a, and the remaining portion of the ALU and the control circuit 19 are illustrated in FIG. 3b. The input gating circuit 13 is also shown in part in FIG. 3a and part in FIG. 3b.

Referring now to FIG. 3a line 28d, which transmits the L3 signal from the latch circuit 25, is coupled to the first of two inputs of a NAND gate 71, and to the first of two inputs of a NOR gate 72. The line 12b of the input data bus, which transmits the D3 digit of the input data, is coupled to the inverting input of an AND gate 73. The second input of the AND gate 73 is coupled to the control signal line 22 between the input gating circuit 13 and the instruction decode circuit 19. The AND gate 73, and other similarly connected AND gates to be described hereinafter, constitute the input gating circuit 13. The output of the AND gate 73 is coupled to the second input of the NAND gate 71, to the second input of the NOR gate 72, to the first of two inputs of an exclusive OR gate 75, and to a line 23a of the bus 23 between the ALU 14 and the control circuit 19. The output of the NAND gate 71 is coupled to the first of three inputs of a NAND gate 76, and to a line 23b of the bus 23. The output of the NOR gate 72 is coupled to the first of two inputs of an AND gate 77, to an inverting input of the NAND gate 76, and to a line 23c of the bus 23. The output of the NAND gate 76 is coupled to an input of a NAND gate 78, and the output of the AND gate 77 is coupled to an inverting input of the NAND gate 78. The output of the NAND gate 78 is coupled to the input of an inverter 79, and to the first of two inputs of an exclusive OR gate 80. The output of the inverter 79 is coupled to the first of four inputs of an AND gate 81. The output of the exclusive OR gate 80 is coupled to the second input of the exclusive OR gate 75, and the output of the exclusive OR gate 75 is coupled to a second input of the AND gate 81. The line 44, which transmits the MSS signal, is coupled to a third input of the AND gate 81. The output of the AND gate 81 is coupled to a line 23d of the bus 23.

The line 28c, which transmits the L2 digit from the latch circuit 25, is coupled to the first of two inputs of a NAND gate 82 and a NOR gate 83. The line 12c, which transmits the D2 digit of the input data, is coupled to the first of two inverting inputs of an AND gate 84. The second inverting input of the AND gate 84 is coupled to the line 22. The output of the AND gate 84 is coupled to the second inputs of the NAND gate 82 and the NOR gate 83. The output of the NAND gate 82 is coupled to the first of three inputs of a NAND gate 85, to a line 23e of the bus 23, to the first of four inputs of an AND gate 86, to the first of four inputs of an AND gate 87, and to the first of three inputs of an AND gate 88.

The output of the NOR gate 83 is coupled to the first of two inputs of an AND gate 89, to a line 23f of the bus 23, to an inverting input of the AND gate 85, and to the first of two inputs of an AND gate 90. The output of the NAND gate 85 is coupled to an input of a NAND gate 91, and the output of the AND gate 89 is coupled to an inverting input of the NAND gate 91. The outputs of the AND gates 86, 87, 88 and 90 are coupled to four of five inputs, respectively, of a NOR gate 92. The fifth input of the NOR gate 92 is coupled to a line 21a of the bus 21. The output of the NOR gate 92 is coupled to a line 23g of the bus 23, and to the second input of the exclusive OR gate 80. The output of the exclusive OR gate 80 is coupled to a line 30d of the result bus 30, which transmits the F3 digit of the result binary number from the ALU 14.

The output of the NAND gate 91 is coupled to the first of two inputs of an exclusive OR gate 94. The output of the exclusive OR gate 94 is coupled to line 30c of the result bus 30, which transmits the F2 digit of the result-binary number from the ALU 14. The second input to the exclusive OR gate 94 is coupled to the output of a NOR gate 95. Three of four inputs of the NOR gate 95 are coupled to outputs of AND gates 96 through 98, respectively. The fourth input to the NOR gate 95 is coupled to the line 21a.

Referring now to FIG. 3b, the line 28b which transmits the L1 digit of data from the latch circuit 25 is coupled to the first of two inputs of a NAND gate 99, and to the first of two inputs of a NOR gate 100. The line 12b which transmits the D1 digit of the input data, is coupled to an inverting input of an AND gate 101. The second inverting input of the AND gate 101 is coupled to the line 22. The output of the AND gate 101 is coupled to the second inputs of the NAND gate 99 and the NOR gate 100. The output of the NAND gate 99 is coupled to the first of three inputs of a NAND gate 102, to a line 23h of the bus 23, to the first of three inputs of the AND gate 98 (FIG. 3a), to the first of three inputs of the AND gate 97 (FIG. 3a), to a second input of the AND gate 83 (FIG. 3a), and to a second input of the AND gate 87 (FIG. 3a).

The output of the NOR gate 100 is coupled to the first of two inputs of an AND gate 103, to a line 23i of the bus 23, to an inverting input of the AND gate 102, to the first of two inputs of the AND gate 96 (FIG. 3a), and to a second input of the AND gate 88 (FIG. 3a). The output of the NAND gate 102 is coupled to an input of a NAND gate 104, and the output of the AND gate 103 is coupled to an inverting input of the NAND gate 104. The output of the NAND gate 104 is coupled to one of two inputs of an inclusive OR gate 105. The output of the exclusive OR gate 105 is coupled to line 30b of the result bus 30, which transmits the F1 digit of the result binary number from the ALU 14. The line 28a which transmits the L0 digit of data from the latch circuit 25 is coupled to the first of two inputs of a NAND gate 110 and to the first of two inputs of a NOR gate 111.

The line 12a, which tansmits the D0 digit of the input data, is coupled to an inverting input of an AND gate 112. The second inverting input of the AND gate 112 is coupled to the line 22. The AND gates 73 and 84 (FIG. 3a), 101 and 112 (FIG. 3b) constitute the input gating circuit 13 (FIG. 1).

The output of the AND gate 112 is coupled to the second inputs of the NAND gate 110 and the NOR gate 111. The output of the NAND gate 110 is coupled to the first of three inputs of a NAND gate 113, to a line 23j of the bus 23, to the first of two inputs of an AND gate 114, to an input of the AND gate 98 (FIG. 3a) and to an input of the AND gate 86 (FIG. 3a).

The output of the NOR gate 111 is coupled to the first of two inputs of an AND gate 115, to a line 23k of the bus 23, to the first of two inputs of an AND gate 116, to an inverting input of the NAND gate 113, to one of the three inputs of the AND gate 97 (FIG. 3a), and to an input of the AND gate 87 (FIG. 3a). The outputs of the NAND gate 113 and the AND gate 115 are coupled to the two inputs of a NAND gate 118. The output of the NAND gate 118 is coupled to one of two inputs of an exclusive OR gate 119. The output of the exclusive OR gate 119 is coupled to the line 30a of the result bus 30, which transmits the F0 digit of the result binary number from the ALU 14.

The outputs of the AND gates 114 and 116 are coupled to two of three inputs of a NOR gate 120. The output of the NOR gate 120 is coupled to the second input of the exclusive OR gate 105. The third input of the NOR gate 120 is coupled to the line 21a.

The instruction decode circuit 18 is set forth within dashed line 18' in FIG. 3b. Line 16a, which transmits the I0 bit of the instruction code, is coupled to a first of three inverting inputs of an AND gate 121, to the input of an inverter 122 and to the first of two inputs on a NAND gate 123. The output of the inverter 122 is coupled to the first of three inputs of a NOR gate 124, and to an inverted input of a NAND gate 125.

The line 16b, which transmits the I1 bit of the instruction code, is coupled to the second inverting input of the AND gate 121, to the input of an inverter 126, to the second input of the NOR gate 124, to the first of two inputs of a NOR gate 127, to the first of two inputs of an AND gate 128, and to the second input of the NAND gate 123. The output of the NAND gate 123 is coupled to the control signal line 27 between the instruction decode circuit 19 and the latch circuit 25 (FIG. 1). The output of the inverter 126 is coupled to the first of two inputs of a NAND gate 130, to the first of two inputs of a NOR gate 131, to the first of two inputs of an AND gate 132, and to a second input of the NAND gate 125.

The line 16c, which transmits the I2 bit of the instruction code, is coupled to the input of an inverter 133, to the third input of the NOR gate 124, to the second input of the NOR gate 127, to the second input of the NAND gate 130, and to the second input of the AND gate 128. The output of the inverter 133 is coupled to the third inverting input of the AND gate 121, to the second input of the NOR gate 131, to the second input of the AND gate 132, and to the third input of the NAND gate 125.

The output of the NOR gate 124 is coupled by means of line 21b of bus 21 to the second input of the AND gate 114, to the third input of the AND gate 98 (FIG. 3a), and to an input of the AND gate 86 (FIG. 3a).

The output of the NAND gate 130 is coupled by means of line 21d of bus 21 to an input of the NAND gate 113, to an input of the NAND gate 102, to an input of the NAND gate 85 (FIG. 3a), and to an input of the NAND gate 76 (FIG. 3a).

The output of the NOR gate 131 is coupled by means of the line 21a to an inverting input of an AND gate 140, to the third input of the NOR gate 120, to the fourth input of the NOR gate 95 (FIG. 3a), and to the fifth input of the NOR gate 92 (FIG. 3a). The output of the NOR gate 127 is coupled to a line 23m of the lines 23, the second input of the AND gate 116, the third input of the AND gate 97 (FIG. 3a), the second input of the AND gate 96, the fourth input of the AND gate 87, the third input of the AND gate 88, the second input of the AND gate 90, and to the fourth input of the AND gate 81.

The outputs of the AND gates 132 and 128 (FIG. 3b) are coupled to the two inputs of a NOR gate 141. The output of the NOR gate 141 is coupled by means of a line 21e of the bus 21 to the second input of the AND gate 115, to the second input of the AND gate 103, to the second input of the AND gate 89 (FIG. 3a), and to the second input of the AND gate 77 (FIG. 3a). The output of the NAND gate 125 (FIG. 3b) is coupled by means of line 21f to an input of the AND gate 140. The output of the AND gate 140 is coupled to the second input of the exclusive OR gate 119.

Referring now to FIG. 4, the control circuit 19 is illustrated in logic diagram form. Line 23c from the output of the NOR gate 72 (FIG. 3a) is coupled to the first of two inputs of an AND gate 144. The line 23f from the output of the NOR gate 83 (FIG. 3a), is coupled to the first of three inputs of an AND gate 145. The line 23b from the output of the NAND gate 71 (FIG. 3a) is coupled to a second input of the AND gate 145. The line 23b is also coupled to the first of four inputs of an AND gate 146, the first of five inputs of an AND gate 147, and to the first of five inputs of an AND gate 148. The line 23i from the output of the NOR gate 100 (FIG. 3b) is coupled to a second input of the AND gate 146. Line 23e from the output of the NAND gate 82 (FIG. 3a) is coupled to a third input of the AND gate 146, to a second input of the AND gate 147, and to a second input of the AND gate 148.

The line 23k from the output of the NOR gate 111 (FIG. 3b) is coupled to an input of the AND gate 147. The line 23h from the output of the NAND gate 99 (FIG. 3b) is coupled to an input of the AND gate 147 and to an input of the AND gate 148. The line 23j from the output of the NAND gate 110 (FIG. 3b) is coupled to a fourth input of the AND gate 148.

The line 16b, which transmits the I1 bit of the instruction code, is coupled to the first of three inputs of a NOR gate 149. The line 16c, which transmits the I2 bit of the instruction code, is coupled to the second input of the NOR gate 149. The line 44, which transmits the MSS (most significant slice) signal, is coupled to the third input of the NOR gate 149, to an inverting input of an AND gate 150, to the first of two input of an AND gate 151, and to the first of two inputs of a NOR gate 152. The output of the NOR gate 149 is coupled to the second input of the NOR gate 152, to the fifth input of the AND gate 148, to the fifth input of the AND gate 147, to the fourth input of the AND gate 146, to the third input of the AND gate 145, and to the second input of the AND gate 144. The line 31, which transmits the $\overline{F3}$ digit from the output register 32 to the control circuit 19 (FIG. 1) is coupled to the second input of the AND gate 151.

The line 16a, which transmits the I0 bit of the instruction code, is coupled to a second inverting input of the AND gate 150. The line 23m from the output of the NOR gate 127 (FIG. 3b) is coupled to the third inverting input of the AND gate 150, to the first of three inputs of an AND gate 153, to the first of three inputs of an AND gate 154, and to the first of three inputs of an AND gate 155.

The line 23a from the output of the AND gate 73 (FIG. 3a) is coupled to the second input of the AND gates 153 and 154. The line 28d, which transmits the L3 digit of the data of the latch circuit 25, is coupled to the third input of the AND gate 153 and to a second input of the AND gate 155. The line 23g from the output of the NOR gate 92 (FIG. 3a) is coupled to the third input of the AND gates 154 and 155.

The outputs of the AND gates 144 through 147 are coupled, respectively, to four of five inputs of a NOR gate 156. The fifth input of the NOR gate 156 is coupled to the line 23d from the output of the AND gate 81 (FIG. 3a). The output of the NOR gate 156 is coupled to the line 47, which transmits the Y output signal from the control circuit 19.

The outputs of the AND gates 148 and 151 are coupled to two of three inputs of a NOR gate 158. The output of the NOR gate 152 is coupled to the third input of the NOR gate 158. The output of the NOR gate 158 is coupled to the line 46, which transmits the X output signal from the control circuit 19. The outputs of the AND gates 150, 153, 154, and 155 are coupled, respectively, to the four inputs of a NOR gate 160. The output of the NOR gate 160 is coupled to the line 45, which transmits the W output signal from the control circuit 19.

Referring now to FIG. 5, a conceptual timing diagram for the ALRS 10 is illustrated. Waveform 162 represents the clock (CP) control signal for the ALRS 10 during a complete cycle ($t_0$ to $t_2$), which cycle is referred to herein as a microcycle. Waveform 163 represents a typical bit of the instruction code (i.e., I0 to I2 and A0 to A2). A bit of the instruction code represents a logical one (1) when at a high level, and represents a logical zero (0) when at a low level. The complement of waveform 163 is illustrated by dashed line 163' to represent a logical zero (0) bit of the instruction code, whereas waveform 163 (solid line) represents a logical one (1) bit of the instruction code. Waveform 164 represents a typical digit of the input data supplied on the bus 12 (FIG. 1), and waveform 165 represents a typical digit of the output data supplied on the lines 40 (FIG. 1). The complements of waveforms 164 and 165 are illustrated by dashed lines 164' and 165', respectively. The input data (waveform 164) and output data (waveform 165) are a logical one (1) when the waveforms are at a low level, and are a logical zero (0) when the waveforms are at a high level. Waveform 166 represents the execute (EX) control signal supplied to the ALRS 10.

The performance of an instruction, as encoded in an instruction code, is controlled by the clock (CP) and execute (EX) control signals. When the clock (CP) signal is at a high level (first half of the microcycle $t_0$ to $t_1$), and the execute (EX) signal is at a low level, latches 56 to 59 (FIG. 2) are enabled by means of AND gate 50 and inverter 51. Thus the binary number in the address location within the RAM 20 appears at the latch circuit 25 input on the lines 26; and is thereby provided at the second operand input of the ALU 14. That is, the outputs of the latches 56 through 59 follow the inputs thereof during this half of the microcycle. Also during the first half of the microcycle, the input data supplied on the bus 12 are provided to the first operand input of the ALU 14 as a function of the status of the control signal supplied on the line 22 between the instruction decode circuit 18 and the input gating circuit 13. The instruction bits I0, I1, and I2 are supplied to the instruction decode circuit 18 during the entire microcycle. Accordingly, control signals are supplied on the bus 21 to the ALU 14 to direct the performance of the instruction encoded in the instruction bits.

When the clock (CP) control signals goes to a low level (second half of the microcycle $t_1$ to $t_2$), the latches are disabled from following the output of the RAM 20 since AND gate 50 (FIG. 2) is enabled thereby providing a high-level signal on the line 37 which disables inverter 51. The latches 56 through 59 store the binary number that appeared on the lines 26a through 26d, respectively. The high-level signal on the line 37 is also supplied to the write enable (WE) input of the RAM 20, which allows "writing" of the result data from the ALU 14 into the RAM at the same address location from which the second operand was previously retrieved. When the clock (CP) control signal goes from a low-level during the second half of the microcycle to a high-level for the next microcycle ($t_2$+), the result binary number from the ALU 14 is entered into the flip-flops 52 through 55 of the output register 32 as a result of a negative transition of the signal on the line 37 at the CP inputs of the flip-flops.

For a description of the operation of the ALRS 10, reference is made to all the aforedescribed figures and to Table I below.

TABLE I

| No. | I2 | I1 | I0 | INSTRUCTION: | COMMENTS: |
|---|---|---|---|---|---|
| 1 | L | L | L | Rx plus BUS pus 1→ Rx | Add with carry |
| 2 | L | L | H | Rx plus BUS →Rx | Add |
| 3 | L | H | L | Rx * BUS →Rx | Logical AND |
| 4 | L | H | H | BUS →Rx | Load Rx |
| 5 | H | L | L | Rx→ BUS (Output Bus) | Read Rx |
| 6 | H | L | H | Rx + BUS→ Rx | Logical OR |

TABLE I-continued

| No. | I2 | I1 | I0 | INSTRUCTION: | COMMENTS: |
|---|---|---|---|---|---|
| 7 | H | H | L | Rx ⊕ BUS → Rx | Exclusive OR |
| 8 | H | H | H | BUS → Rx | Load Complement |

H = Logic High Level
L = Logic Low Level

Table I above sets forth the eight possible combinations of the I2, I1 and I0 instruction bits of the instruction code and a brief statement of the operation to be performed thereby. The symbol Rx represents the contents of the location in memory addressed by the combination of the address bits A0, A1 and A2, and the term BUS generally refers to the data on the input data bus 12 unless otherwise specified, as in instruction code No. 5.

For the instruction code No. 1, wherein the instruction bits (I0, I1, and I2) are all at a logic low level, the binary number retrieved from the addressed location in the RAM 20 (second operand) is added to the binary number supplied on the input data bus 12 (first operand) and to a binary one in the low-order position by the ALU 14. The result of this operation is supplied on the result bus 30, and is stored in the RAM 20 at the same memory location from which the second operand was retrieved.

In particular, AND gate 121 (FIG. 3b) is disabled and a low-level signal is supplied on the line 22 to the inverting inputs of the AND gates 101 and 112, and the AND gates 73 and 84 (FIG. 3a). In this embodiment, a low-level signal supplied on the lines 12a–12b (input data bus 12) represents a logic one, and a high-level signal represents a logic zero. Accordingly, the input data supplied on the bus 12 is gated through the input gating circuit 13 (AND gates 73, 84, 101 and 112) to the inputs of the gates 71, 72, 82, 83, 99, 100, 110 and 111.) At the same time, the RAM 20 is addressed at a location Rx, and the binary number thereby retrieved (assuming such a binary number was previously stored therein) is supplied through the latch circuit 25 onto the lines 28a through 28d. A high level signal supplied on the lines 28a through 28d (bus 28) represents a logic one, and a low-level signal on these lines represents a logic zero. The binary number retrieved from the RAM 20 is supplied simultaneously to the ALU 14 at the inputs of the same gates 71, 72, 82, 83, 99, 100, 110 and 111.

Within the instruction decode circuit 18, in response to the first instruction code, the outputs of the gates 121, 124, 131 and 141 are at low-level, and the outputs of the gates 127, 130, 125 and 123 are at a high level. Assume, for example, that the number 15 is stored in the RAM 20 at a location Rx, and the number 15 is supplied on the input data bus 12. The binary equivalent for the decimal number 15 is 1111. Thus, a high-level signal is supplied on each of the lines 28a through 28d, and a low-level signal is supplied on each of the lines 12a through 12d. In response to these data inputs, and the first instruction code, the outputs of the exclusive OR gates 80, 94, 105 and 119 will be at a high level, and the X and Y output signals from the control circuit 19 (outputs of the NOR gates 158 and 156, FIG. 4) will also be at a high level indicating a carry generate from the ALRS 10. The W output signal from the control circuit 19 will be at a low level indicating a carry output from the ALRS 10. This binary arithmetic operation is summarized below:

|  | | Binary | Decimal |
|---|---|---|---|
| 1st operand on input data bus 12 | | 1111 | 15 |
| 2nd operand on bus 28 | | 1111 | 15 |
| Plus 1 | | 1 | 1 |
| Total, with a carry of one | 1 | 1111 | 31 |

The MSS signal in the above-described example was at a low level, which indicates that the ALRS 10 in the example is performing operations on lower order four-digit nibbles in an array of ALRS devices. In one such array configuration, as will be described hereinbelow, the X and Y outputs are ignored and the W output is supplied to the I0 instruction bit input of the next higher order four-digit nibble ALRS device. The low-level signal on the W output would hence provide an input signal indicative of an arithmetic carry into the next higher order nibble device.

In another array configuration, also to be described hereinbelow, the W output is ignored and the X and Y outputs are coupled to carry propagate and carry generate, respectively, inputs of a carry-look ahead generator. The high-level signals on the X and Y outputs would provide indications to the next higher order four-digit ALRS device by means of the carry-look ahead generator that an arithmetic carry will occur if an additional binary one is added to the present result from the ALU 14 (carry propagate), and that an arithmetic carry to next higher order device is occurring (carry generate). Note that if the ALRS 10 is performing operations on the most significant four-digit slice in an array of ALRS devices, then the aforedescribed example is not valid since the state of the most significant digit position is indicative of the sign of the result binary number.

Referring now to FIG. 6, a plurality of arithmetic logic register stacks, constructed in accordance with principles of the present invention, are coupled together in an array to form a binary number of M binary digits in length, wherein M is an integer of multiples of four. For simplification of explanation the least significant four digit nibble ALRS device will be referred to herein as ALRS device 171, the second through nth four digit nibble devices will be referred to herein collectively as ALRS device 172, and the most significant four digit nibble device will be referred to herein as ALRS device 173. The ALRS device 172, as illustrated in FIG. 6, represents the second through the nth four-digit nibbles of the array and is not limited to only one ALRS as shown.

The execute (EX) control signal, which is supplied on the line 36, is coupled together for each of the ALRS devices 171, 172, and 173. Also, the clock (CP) and the output enable (OE) control signals supplied on the lines 35 and 38, respectively, are coupled together for each of the ALRS devices 171, 172, and 173. In the same manner, the zero (Z) output supplied on the line 42 for each of the ALRS devices 171, 172, and 173 are coupled together to provide a single Z output from the array. However, the single Z output is also coupled to a bias voltage supply $V_{cc}$ through a pull-up resistor R10. As stated hereinabove, the NOR gate 64 (FIG. 2) has an open collector output. Hence, a pull-up resistor is required at the output thereof to provide an output signal. The use of an open collector gate for NOR gate 64 enables a "wired AND" connection between the zero (Z) outputs of each of the ALRS devices 171, 172, and 173, and thereby provide a not zero low-level output signal when any one of the NOR gates within any one of the ALRS devices is activated. Resistor R10 acts as a single pull-up resistor for the NOR gates (corresponding to NOR gate 64) within devices 171, 172 and 173.

The ALRS device array illustrated in FIG. 6 is referred to herein as a ripple-carry expansion array, and is employed when speed of operation is not critical. That is, an arithmetic carry or other output signal from a low-order nibble ALRS device must "ripple" through the next higher order ALRS devices, and is ultimately provided as a carry output signal at a carry output of the most significant nibble ALRS device. The MSS input, supplied on the line 44, is coupled to ground potential for the ALRS device 171, and is also coupled to ground potential by means of line 44' for the ALRS device 172. However, for the most significant four-digit nibble ALRS device 173 the MSS input is coupled by means of line 44'' to a voltage supply $V_{cc}$. Referring briefly to FIGS. 3a and 4, when the MSS input is at a low level (i.e., coupled to ground potential) AND gate 81 (FIG. 3a) is disabled, AND gate 150 (FIG. 4) is enabled, AND gate 151 (FIG. 4) is disabled, and NOR gate 149 and 152 (FIG. 4) are enabled. However, the converse is true for the respective gates within the most significant four-digit nibble ALRS device 173 since the MSS input is coupled to a positive voltage $V_{cc}$.

The A-field of the instruction code (address bits A0 through A2) are each coupled together for the devices 171, 172, and 173, thereby forming an address bus for the array. The I-field inputs I0, I1, and I2 of the instruction code for the array are coupled differently. That is, the I1 and I2 instruction bits of all the devices 171, 172, and 173 are coupled together. However, the I0 instruction bit has a dual purpose for the ALRS of the present invention, and is coupled to the I0 input of the ALRS device 171 only. The W output signal supplied on the line 45 of ALRS device 171 is coupled to the I0 input of the ALRS device 172. Likewise, the W output of the ALRS device 172 is coupled to the I0 input of the ALRS device 173. The X and Y outputs of the lower order byte devices 171 and 172 are ignored. The W, X and Y output control signals from the ALRS device 173 are supplied on lines 45'', 46'', and 47'', for supplying the carry-out, negative, and over-flow signals, respectively, from the ALRS array. As stated hereinabove, the W, X and Y outputs from the ALRS device of this invention have two functions. The first function is to provide negative and overflow output signals from the device when the MSS input signal is at a high level, and for providing carry propagate and carry generate output signals when the MSS input signal is at a low level.

An arithmetic instruction is represented by the instruction code when the instruction bits I1 and I2 are equal to zero. Accordingly, the W output signal will reflect the carry output of each of the ALRS devices 171, 172, and 173. As illustrated in FIG. 6, and described above, the carry output signal from the ALRS device 171 is supplied by means of the line 45 to the I0 input of the ALRS device 172. In a similar manner, the W output of the ALRS device 172 supplies the carry output signal therefrom to the I0 input of the ALRS device 173. The W output from the ALRS device 173 supplied on the line 45" constitutes the carry output signal from the ALRS device array.

The X output of the ALRS device 173 will be at a low level if the highest order digit (On+4) of the answer is a one, which indicates a negative number from the array. The Y output of the ALRS device 173 will be at a low level when an arithmetic over flow has occurred without the ALU of that device. It is pointed out that if both operands provided to the array have the same sign and the answer has an opposite sign, then it is assumed that an overflow operation has occurred within the combined ALU's of the devices 171, 172, and 173.

A non-arithmetic instruction is represented by either the instruction bit I1 or the instruction bit I2 or both being equal to a one (1). The W output from each of the devices 171, 172, and 173 will accordingly represent the state of the I0 input thereof. Hence, for non-arithmetic instuctions all I0 input are effectively coupled together by means of the control circuit 19 within each of the ALRS devices 171, 172, and 173. The X and Y outputs of the lower order digits, that is the X and Y outputs of the ALRS devices 171 and 172 are not employed for the ripple-carry expansion array since the MSS inputs for the ALRS devices 171 and 172 are coupled to ground potential (i.e., a low voltage). These outputs are employed however, for a second array configuration to be described in greater detail hereinbelow. Note that the carry propagate and carry generate are not needed for the highest order device ALRS 173. Accordingly, the MSS input to the ALRS device 173 is coupled to a positive voltage ($V_{cc}$), which modifies operation of the control circuit 19 as described above within the device 173 to thereby gate the negative and overflow output signals on the X and Y outputs thereof.

Figure 7:
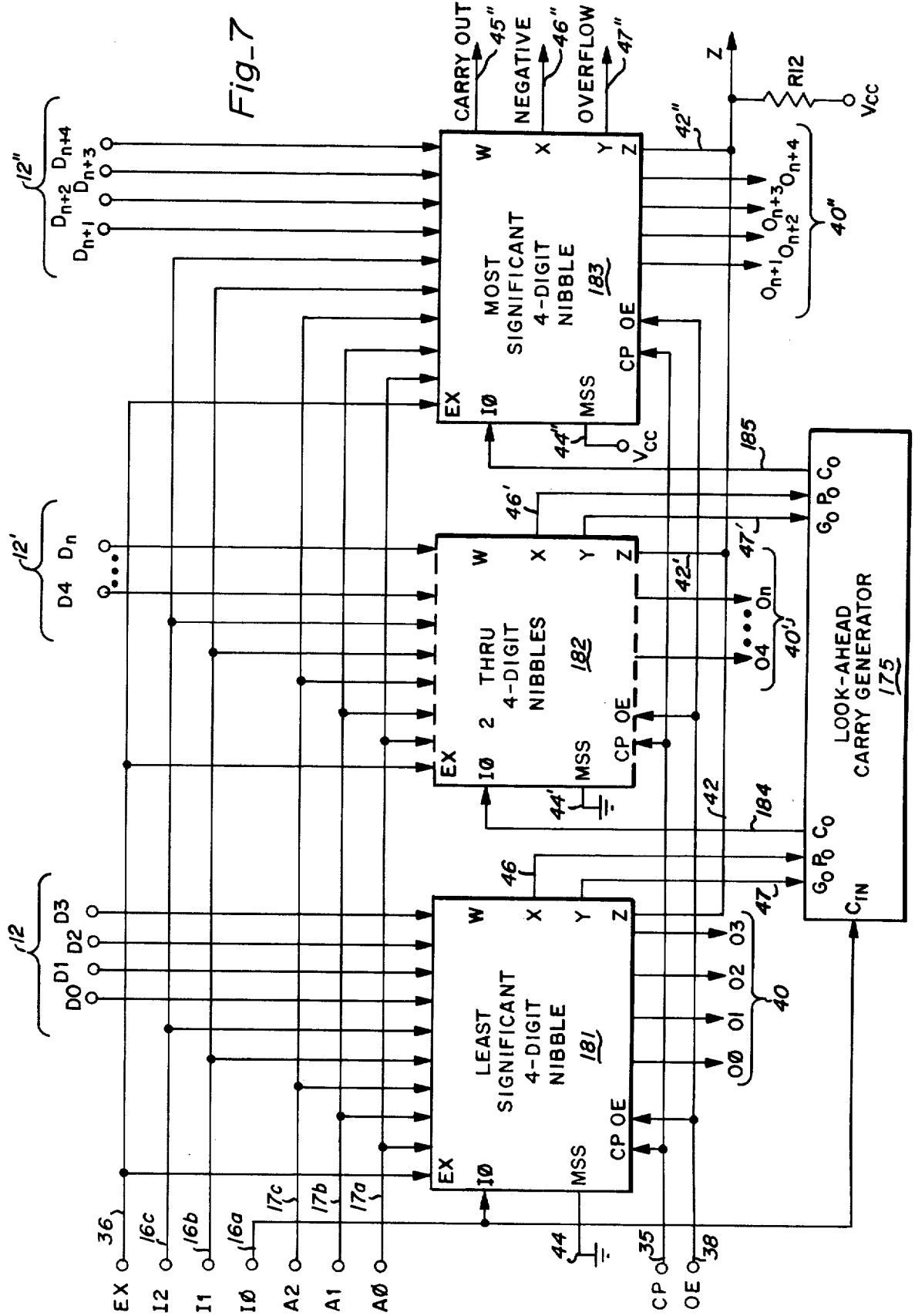
FIG. 7 is a block diagram of an array employing a plurality of the ALRS of this invention.

Referring now to FIG. 7, a second type of array employing ALRS devices 181, 182 and 183 constructed in accordance with the principles of the present invention is illustrated. In this array a look-ahead carry generator 175 is employed to enable an increase in the speed of operation of the array. The look-ahead carry generator 175 is a conventional device known in the art and may be, for example, a Fairchild Device type 93S42 as manufactured by the assignee of this invention.

The array illustrated in FIG. 7 is coupled in the same manner as that described above for the array illustrated in FIG. 6 with the following exceptions. The I0 input digit supplied on the line 16a is coupled to a carry input ($C_{in}$) of the look-ahead carry generator 175 in addition to being coupled to the I0 input of the least significant four-digit nibble ALRS device 181. The X output of the ALRS device 181, which is supplied on the line 46, is connected to the carry propagate ($P_0$) input of the look-ahead carry generator 175 by means of the line 46. The Y output from the device 181 is coupled to the carry generate ($G_0$) input of the generator 175 by means of the line 47. The carry output ($C_0$) of the low-order position of the generator 175 is coupled to the I0 input of an ALRS device 182 by means of a line 184.

The ALRS device 182, as illustrated in FIG. 7, represents the second through the nth four-digit nibbles of the array and is not limited to only one ALRS as shown. In a similar manner, the X output from the ALRS device 182 is coupled by means of the line 46' to the carry propagate ($P_n$) input of the generator 175; and the Y output of the device 182 is coupled by means of line 47' to the carry generate ($G_n$) of the generator 175.

The carry output ($C_n$) for the nth output of the generator 175 is coupled to the I0 input of an ALRS device 183 by means of a line 185. The Z outputs from each of the ALRS devices are connected together to form a common zero output from the array, and this connection is coupled to a voltage supply $V_{cc}$ through a resistor R12.

Accordingly, the I0 digit inputs for the devices 182 and 183 are obtained from the carry-look ahead generator 175. For an arithmetic instruction, the I0 digit input will be treated as a carry-in input to an ALRS device, irrespective of the status of the W output signals from the devices 181 and 182 (lower order nibbles of the array), which W outputs are ignored in this implementation of an array. The W output from the device 183 constitutes the carry output signal from the array. The I0 instruction bit of the instruction code constitutes an instruction input as well as a carry input to the array in the same manner as that for the array illustrated in FIG. 6.

For non-arithmetic instructions, the control circuit 19 within each of the ALRS devices 181 and 182 forces a low-level signal on the X outputs, and forces a high-level output signal on the Y output for each of the low-order nibble devices 181 and 182. Also, when the carry propagate (P) input to the carry-look ahead generator 175 is at a low level, and the carry generate (G) input thereof is at a high level, the associated carry outputs (C) are the same as the carry input ($C_{in}$). Hnece, the I0 instruction bit of the low-order nibble ALRS devices 181 and 182 will be at the same logic level as that supplied on the instruction bit I0 input to the device 181 during a non-arithmetic instruction.

Accordingly, the I0 digit inputs of the ALRS devices 181, 182, and 183 of the array are effectively bused together during an non-arithmetic instruction even though there is no direct connection therebetween. To accomplish this purpose then, the I0 instruction bit input line 16a to the array must be coupled to the carry input ($C_{in}$) of the carry-look ahead generator 175 for proper operation. Thus, the generator 175 passes therethrough instruction information when the ALRS device array is not involved in an arithmetic operation. The X and Y outputs of the ALRS device 183 represent negative and overflow outputs from the array.

Referring now to FIG. 8, a logic-block diagram of the RAM 20, latch circuit 25, and the write enable gate circuit 34 is illustrated with alternate interconnections therebetween. The address bus 17 (lines 17a, 17b, and 17c), the result bus 30 (lines 30a through 30d), and the data out bus 26 (lines 26a through 26d) are coupled to the RAM 20 in the same manner as described above and illustrated in FIG. 2. Also, the latch circuit 25, which comprises latches 56 through 59, is coupled between the data out bus 26 and the second operand bus 28 (lines 28a through 28d) as described above.

Line 36, which transmits the execute (EX) control signal to the ALRS is coupled to the first inverting input of the AND gate 50 as described above. The line 35, which transmits the clock (CP) control signal, is coupled to the second inverting input of the AND gate 50, and directly to the enable (E) inputs of the latches 56 through 59. The output of the AND gate 50 is coupled to the write enable (WE) input of the RAM 20, and to the line 37. Note that the inverter 51 (FIG. 2) has been eliminated from the circuit configuration illustrated in FIG. 8. The line 37 is coupled to the inverting clock (CP) inputs of the flip-flop 52 through 55 (FIG. 2).

The alternate circuit connection shown in FIG. 8 allows the ALRS 10 to perform the following operation:

$$Rx \ (f) \ BUS \rightarrow Ry$$

wherein Rx is data from a first address in the RAM 20; "(f)" generally refers to an arithmetic or logic operation (see Table I hereinabove), and Ry is data to be stored at an address in the RAM 20 different from that for Rx.

The conceptual timing diagram shown in FIG. 9 will aid in an understanding of the abovedescribed operation. Waveform 190 represents the clock (CP) control signal for the ALRS 10 during a complete microcycle ($t_o$ to $t_4$). Waveform 191 represents a typical instruction bit (I0, I1, or I2) of the instruction code, and waveform 192 represents a typical address bit (A0, A1, or A2) of the instruction code. Waveform 193 represents the execute (EX) control signal supplied to the ALRS 10. The dashed line waveforms associated with waveforms 191 and 192 represent the complementary states of these waveforms.

A distinction to be made between the timing diagram shown in FIG. 9 and that shown in FIG. 5 is that the address bits (A0, A1, or A2), as represented by waveform 192, change state at time $t_2$ independent of the instruction bits (I0, I1, or I2) as represented by waveform 191. Also, the execute (EX) control signal (waveform 193) changes state during the second half of the microcycle at time $t_3$ after the address bits (waveform 192) have changed state at time $t_2$.

The performance of an instruction, as encoded in an instruction code, is controlled by the clock (CP) and execute (EX) control signals as described above. When the clock (CP) control signal is at a high level (first half of the microcycle, $t_o$ to $t_1$), latches 56 through 59 (FIG. 8) are enabled. The binary number in the addressed location (Rx) within the RAM 20 appears at the D inputs of the latches 56 through 59 by means of lines 26a through 26d, respectively. This binary number is thus provided at the second operand input of the ALU 14. The input data supplied on the bus 12 (FIG. 1) is provided at the first operand input of the ALU 14 in the same manner as described above. Also, the control signals are supplied on the bus 21 to the ALU 14 to direct the performance of the instruction encoded in the instruction bits (I0, I1, and I2).

When the clock (CP) control signal goes to a low level (second half of the microcycle $t_1$ to $t_4$), a new address (Ry) is provided on bus 17 at $t_2$, and the latches 56 through 59 are disabled from following the RAM 20 data out on bus 26. The latches 56 through 59 store the binary number from (Rx) that appeared on the lines 26a through 26d, respectively. The output of the AND gate 50, which is coupled to the write enable (WE) input of the RAM 20 remains at a low level from time $t_o$ to time $t_3$ when the execute (EX) control signal goes to a low level. Hence, the result binary number is written into the RAM 20 at an address (Ry) different from that where the binary number was retrieved.

Figure 10:
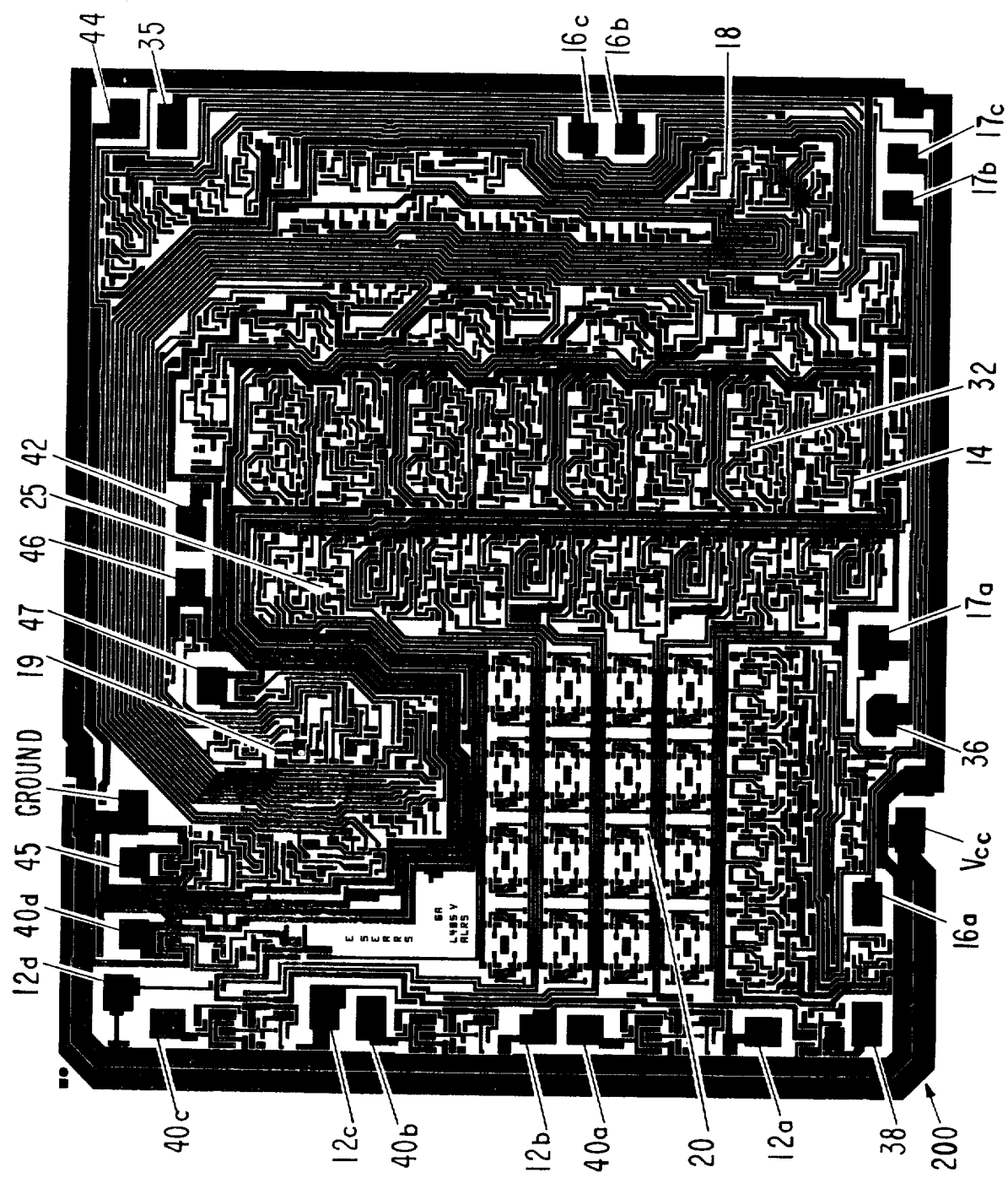

Referring now to FIG. 10, a photolithographic print of the metallization pattern of a single semiconductor chip 200 comprising the ALRS 10 of this invention. Like reference numerals are employed in FIG. 10 to identify the components illustrated and described hereinabove. All pin connections are labeled with reference numerals corresponding to all the input and output line reference numerals of the ALRS 10 shown in FIG. 1. The ground pin connection is identified by "ground", and the voltage supply pin is identified by "$V_{cc}$."

The ALU 14, instruction decode circuit 18, control circuit 19, RAM 20, latch circuit 25, and the output register 32 are all identified generally by like reference numerals with associated lead lines. Constituent parts of the ALU 14 and the output register 32 are interdigitated on the semiconductor chip 200 for maximum use of the chip area. Only one part of the ALU 14 and one part of the output register 32 are identified for simplification of the drawing. However, these parts are repeated in alternate fashion to form both the ALU and the output register as may be seen by reference to FIG. 10. Also, the gates comprising the input gating 13 are incorporated within the constituent parts of the ALU 14. Accordingly, it may be seen that a single chip arithmetic logic register stack is provided.

What is claimed is:
1. A single chip large scale integration device, comprising:
   a. a memory disposed for storing data having an address input coupled to address input pins of said device, a data input, and a data output;
   b. an arithmetic logic unit having a first operand input coupled to data input pins of said device, a second operand input coupled to said data output of said memory, a result data output coupled to said data input of said memory, an instruction signal input coupled to instruction code input pins of said device, and a control signal output;
   c. an output register coupled between said result data output of said arithmetic logic unit and data output pins of said device; and,
   d. circuit means disposed for providing status output signals of said device on status output pins of said device, and having a first input coupled to said control signal output of said arithmetic logic unit, and a second input coupled to said instruction code input pins of said device.

2. A single chip large scale integration device as defined in claim 1 further characterized by means for decoding instruction codes coupled between said instruction code input pins and said control signal input of said arithmetic logic unit.

3. A single chip large scale integration device as defined in claim 1 further characterized by said circuit means including:
   a. first means for providing arithmetic carry information during arithmetic operations and instruction code information during logic operations on said status output pins in response to a first state of said circuit means; and,
   b. second means for providing status information of said arithmetic logic unit on said status output pins during a second state of said circuit means.

4. A single chip large scale integration device as defined in claim 3 further characterized by said circuit means including gating means having an input coupled to a control signal input pin of said device, said gating means being disposed for selecting said first and said second states of said circuit means.

5. A large scale integration device as in claim 1 functionally operable whereby N of said devices are electrically coupled together for performing operations with M-digit binary numbers, N being an integer greater than one and M being an integer equal to 4×N, further characterized by said circuit means including gating means for providing arithmetic carry information during arithmetic operations and instruction code information during logic operations on said status output pins of N—1 of said devices, and for providing status information on said status output pins of the Nth one of said devices, wherein the Nth one of said devices performs operations on the four most significant digits of the binary number.

6. An expandable digital arithmetic-logic register stack device, comprising:
   a. means for storing digital data having an address input, a data input, and a data output;
   b. means for performing arithmetic and logic operations having:
      i. a first operand input coupled to input terminals of said device,
      ii. a second operand input coupled to said data output of said means for storing,
      iii. a result data output coupled to said data input of said means for storing,
      iv. control signal input terminals disposed for receiving instruction codes indicative of arithmetic and logic operations to be performed; and,
      v. a control signal output disposed for providing signals indicative of the arithmetic and logic operations being performed;
   c. an output register coupled between said result data output of said means for performing and data output terminals of said device; and,
   d. circuit means disposed for providing status information of said device on status output terminals thereof, and having an input coupled to said control signal output of said means for performing.

7. A device as defined in claim 6 further characterized by said circuit means including:
   a. first means for providing arithmetic carry information on said status output terminals during arithmetic operations and instruction information on said status output terminals during logic operations in response to a first stage of said circuit means; and,
   b. second means for providing status information on said status output terminals in response to a second state of said circuit means.

8. A device as defined in claim 6, further characterized by said circuit means including gating means having an input coupled to a control signal input terminal of said device, said gating means being disposed for selecting said first and said second states of said circuit means.

9. A device as defined in claim 6 integrated onto a single semiconductor chip.

10. A device as defined in claim 6 further characterized by said means for storing comprising a random access memory.

11. A large scale integration device as in claim 6 functionally operable whereby N of said devices are electrically coupled together for performing operations with M-digit binary numbers, N being an integer greater than one and M being an integer equal to 4×N, further characterized by said circuit means including gating means for providing arithmetic carry information during arithmetic operations and instruction code information during logic operations on said status output terminals of N-1 of said arithmetic logic register stacks, and for providing status information on said status output terminals of the Nth one of said arithmetic logic register stacks, wherein the Nth one of said arithmetic logic register stacks performs operations on the four most significant digits of the M-digit binary number.

12. A single chip digital circuit comprising:
   a. means for storing digital data having an address input coupled to address input pins of said chip, a data input and a data output,
   b. an arithmetic logic unit having a first operand input coupled to data input pins of said chip, a second operand input coupled to said data output of said means for storing, a result data output coupled to said data input of said means for storing, a control signal input and a control signal output;
   c. means for decoding instruction information supplied on instruction code input pins of said chip and having an output thereof coupled to the control signal input of said arithmetic logic unit;
   d. an output register coupled between said result data output of said arithmetic logic unit and data output pins of said chip; and,
   e. circuit means disposed for providing arithmetic carry information signals during arithmetic operations of said circuit and instruction information during logic operations of said circuit on status output pins of said chip in response to a first state of said circuit means, and for providing on said status signal output pins status information in response to a second state of said circuit means.

13. A circuit as defined in claim 12 further characterized by said means for storing comprising a random access memory.

14. A circuit as defined in claim 12, wherein the second operand supplied to said arithmetic logic unit is retrieved from said memory in response to address information supplied on said address input pins of said chip, said circuit further characterized by means for entering result data from said arithmetic logic unit into said memory at the same address from where the second operand was retrieved.

15. A circuit as defined in claim 14 further characterized by means for entering result data from said arithmetic logic unit into said memory at an address different from the address from where the second operand was retrieved.

16. A large scale integration device as in claim 12 functionally operable whereby N of said devices are electrically coupled together for performing operations with M-digit binary numbers, N being an integer greater than one and M being an integer equal to 4×N, further characterized by said circuit means including gating means for providing arithmetic carry information during logic operations on said status signal output pins of N—1 of said circuits, and for providing status information on said status signal output pins of the Nth one of said circuits, wherein the Nth one of said circuits performs operations on the four most significant digits of the M-digit binary number.

* * * * *